United States Patent [19]
Waltz

[11] Patent Number: 5,367,303
[45] Date of Patent: Nov. 22, 1994

[54] PARALLEL OBSERVER SPATIAL EVALUATOR

[75] Inventor: Edward L. Waltz, Sparks, Md.

[73] Assignee: AlliedSignal Inc., Morris Township, Morris County, N.J.

[21] Appl. No.: 126,961

[22] Filed: Sep. 17, 1993

[51] Int. Cl.$^5$ .......................... G01S 13/74; G01S 13/78
[52] U.S. Cl. .......................... 342/37; 342/40; 342/45; 342/46
[58] Field of Search .......................... 342/45, 46, 37, 40

[56] References Cited
U.S. PATENT DOCUMENTS

| | | | |
|---|---|---|---|
| 3,801,980 | 4/1974 | Danton et al. | 342/45 |
| 4,075,631 | 2/1978 | Dumez | 342/45 |
| 5,001,751 | 3/1991 | Sanford et al. | 342/45 |
| 5,089,822 | 2/1992 | Abaunza et al. | 342/40 X |

*Primary Examiner*—John B. Sotomayor
*Attorney, Agent, or Firm*—Howard G. Massung

[57] ABSTRACT

A method and means for evaluating transponder reply signals in a secondary radar system to differentiate valid replies from false replies. Transponder reply signals received by the interrogating radar are decoded to establish conformity with an established format. All decoded replies to a succession of N interrogation signals are stored in their order of reception in an array of N shift registers. A reply filter is associated with each of the N shift registers. The reply filters operate in parallel to scan the stages of each associated shift register. A unary adder provides the number M of replies detected by the reply filters at each scan step. Reply decision means selects a threshold value that is dependent upon operating conditions of the radar and generates a valid reply signal whenever the value M equals or exceeds the selected threshold value.

10 Claims, 2 Drawing Sheets

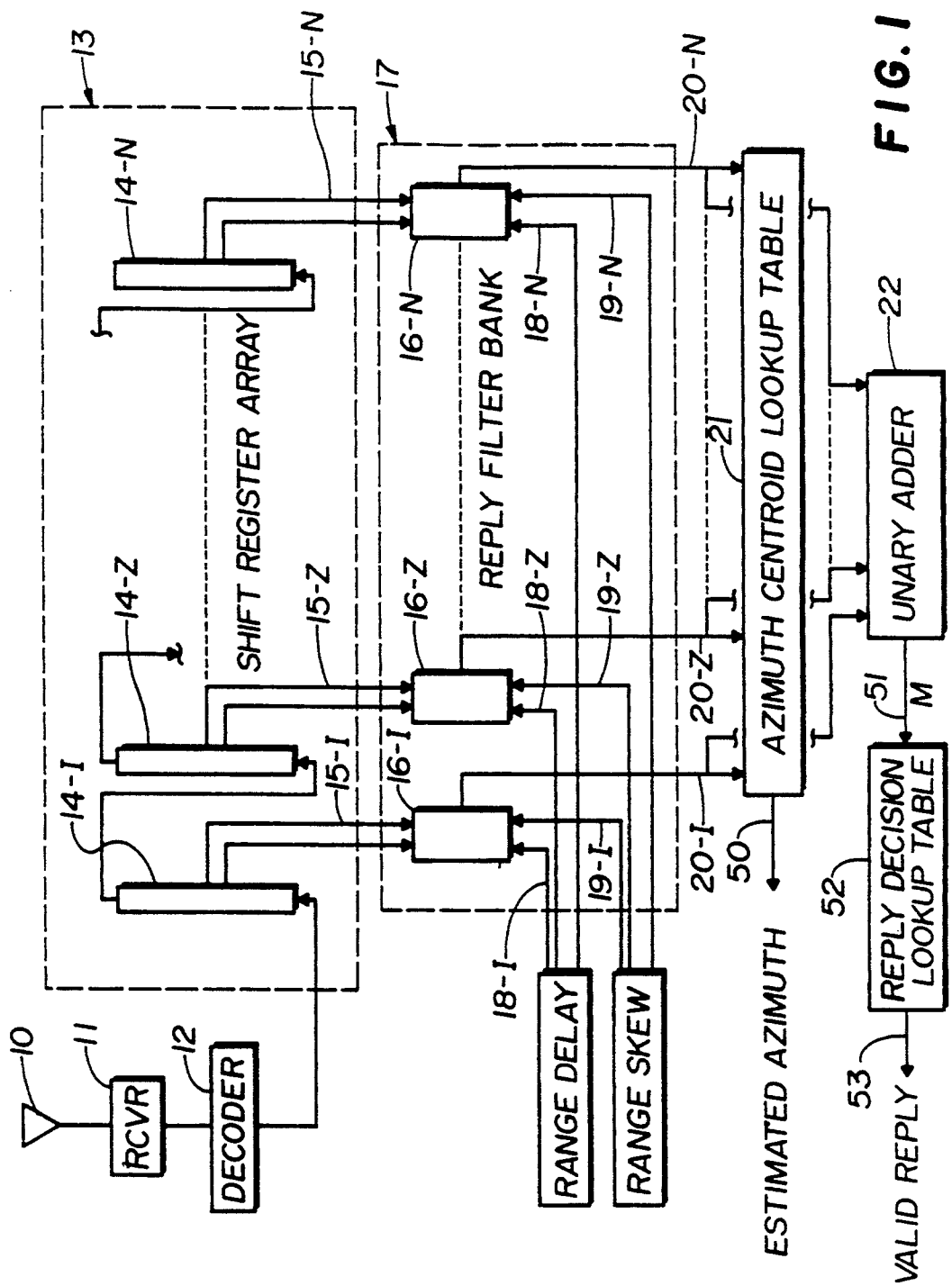
FIG. I

PARALLEL OBSERVER SPATIAL EVALUATOR

FIELD OF THE INVENTION

The present invention relates generally to secondary radars of the type used in the Air Traffic Control Radar Beacon System (ATCRBS) and in military Identification Friend or Foe (IFF) systems. More particularly, it relates to a method and means for evaluating transponder reply signals to interrogation signals from an interrogating radar to differentiate valid reply signals from false reply signals.

BACKGROUND OF THE INVENTION

ATCRBS and IFF radar beacon system interrogators are troubled by the occurrence of many false reply signals that are indistinguishable from valid reply signals on the basis of proper spacing of framing pulses and similar criteria. Such false signals may be the result of transponder responses to interrogations by a second radar, or may result from overlapped responses by two or more transponders to the same interrogating radar. In an IFF system, false signals may be caused intentionally by a hostile party attempting to mislead the interrogating party.

False reply signals that are passed by bracket decoders, i.e., those reply signals having properly spaced framing pulses, are known in the art as fruit and the means for discriminating against such signals are known as defruiters. Defruiters operate on the principle that fruit occurs asynchronously so that replies which do not appear successively at consistent ranges can be rejected as false replies. In an IFF system, replies may be delayed by an amount specified in an encoded interrogation signal in order to conceal the true range of the responding targets from unfriendly forces. Encoded interrogations provide a means for validating the authenticity of replies because only friendly forces can decode the requested delay value and respond with a correctly delayed reply. Such security delays, however, complicate the defruiting process.

U.S. Pat. Nos. 3,182,310, issued May 4, 1965 and 3,302,197, issued Jan. 31, 1967, both to B. H. Humpherys, disclose sequential defruiters in which bracket decoded reply signals to a first interrogation signal are input to a delay line having a length equal to the pulse repetition interval (PRI), i.e., the interval between interrogation signals. Bracket decoded reply signals to the interrogation signal next following the first are compared as they are received with overflow outputs from the delay line. Those bracket decoded reply signals received during the second PRI that coincide with outputs from the delay line are accepted as valid reply signals.

The defruiters of the '310 and '197 patents have the disadvantage of requiring bracket decoded reply signals to be time coincident for two successive interrogation signals to be declared valid, although it is possible for valid reply signals to be present without their being received or successfully decoded during successive PRIs.

U.S. Pat. No. 3,781,881, issued Dec. 25, 1973, to J. M. Hovey, discloses a beacon target evaluator in which decoded reply signals on a video input bus are shifted serially into a plurality of N-1 series connected shift registers. Any signal appearing on the input bus that has occurred at the same relative time during any of the N-1 previous PRIs will appear at the output of the shift register related to such previous PRI. Logic means are connected to the input bus and the outputs of each of the shift registers for determining the number of times a signal on the input bus coincides with outputs from the shift registers. Means are thereby provided for establishing an M of N criterion for determining the validity of reply signals, where M is the number replies at a particular range that have appeared during N interrogations. Although the '881 evaluator does not require that the replies be received during consecutive PRIs to be deemed valid, it does require that valid replies all appear at the same range during each PRI. Consequently, replies from rapidly moving targets may not be evaluated properly and no provision is made for evaluating replies in IFF systems that contain intentional security delays.

U.S. Pat. No. 4,896,158, issued Jan. 23, 1990, to E. L. Cole, Jr. discloses a beacon fruit filter in which a Hold window and an Age window are established upon the appearance of an initial reply. The Hold window extends for five PRIs and the Age window extends for ten PRIs, suitably. The number of range coherent replies received within the Hold window are compared with a first threshold and the number of such replies received within the Age window are compared with a second threshold. Replies within the Hold window and replies within the Age window equaling or exceeding the respective first and second thresholds are output for further processing. Otherwise, the replies are discarded.

The beacon fruit filter of the '158 patent does not make reply validity determinations on the basis of all information received during N successive PRIs replies. Rather, those replies which fail to pass the first or second thresholds are discarded. A small amount of tolerance to accommodate range jitter of the responding targets is provided. However, no provision is made for replies from fast moving targets or for replies containing intentionally inserted security delays.

It is an object of the invention to provide, in a secondary radar system, a method and means for evaluating reply signals received by an interrogator wherein all replies received to N successive interrogation signals are retained for examination in parallel by a moving window spatial filter, thereby utilizing all available information relating to target range and bearing in making a reply validation decision.

It is another object of the invention to provide a method and means for evaluating reply signals received by an interrogator of a secondary radar system wherein allowances are made for security delays intentionally inserted in reply signals by responding targets, for replies from fast moving targets, and for range jitter.

Other objects and advantages of the invention will become evident as a full understanding thereof is gained from the detailed description to follow.

SUMMARY OF THE INVENTION

Briefly, the present invention comprises an array of series connected shift registers or equivalent data storage means. The shift registers total N in number, with each shift register having a number of stages, sometimes referred to herein as range bins, dictated by the maximum range and range resolution of the interrogating radar. For example, for a radar having a 100 nm. range, the shift registers might suitably comprise 100 stages with a commensurate clock rate so that each stage represents a range bin of 1 nm.

Each successfully decoded reply signal received during each PRI is applied as a logic "1" to the input stage of the first shift register of the array. The final stage of each shift register is connected to the input stage of the succeeding shift register so that overflow from a preceding shift register is input to a succeeding shift register. At the end of N complete PRIs, the shift registers of the array will be loaded with logic "1" in the range bins corresponding to the range from which each of the reply signals was received during the N PRIs. The register array may be regarded as a matrix with the shift registers columns corresponding to increments of azimuth and the successive range bins of the registers forming progressive rows of range.

A moving window extends across the columns of the matrix and progressively traverses the range bin rows. The window receives inputs in parallel from all range bins of a row as that row is contacted by the window. Means are provided for determining the number of logic "1's" received by the window from each range bin row. When such number equal or exceeds a predetermined value of M, the replies contained in that range bin row are accepted as a valid reply. Means are provided for compensating for moving targets and for security delays intentionally inserted by responding targets. Means are also included for providing more accurate estimates of the azimuth of valid replies.

DESCRIPTION OF THE DRAWINGS

FIG. 1 is a functional block diagram of the invention.

DETAILED DESCRIPTION OF THE INVENTION

Figures 2A, 2B, 2C:
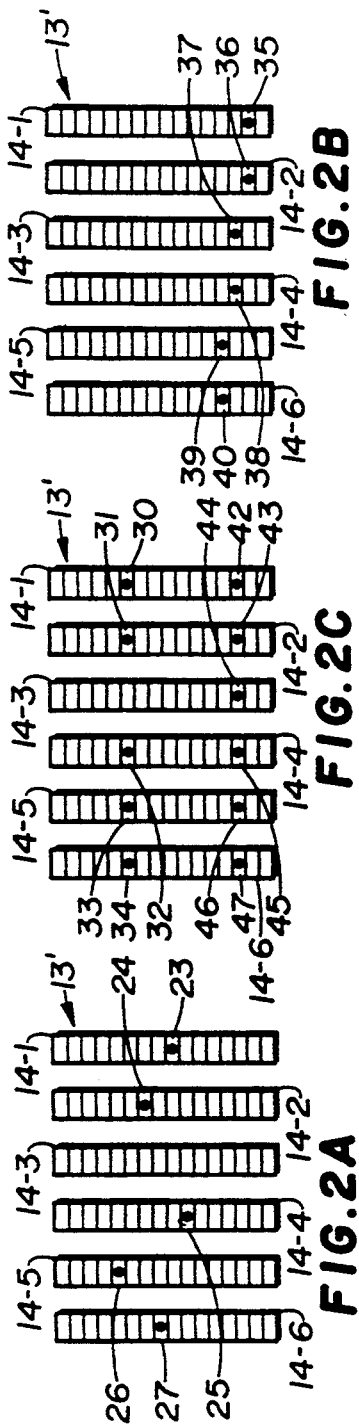
FIG. 2A is a simplified representation of the shift register array forming part of the invention when the array is loaded with security delayed replies from a single target.
FIG. 2B is a representation of the shift register array of FIG. 2A when the array is loaded with replies from a single, fast moving target.
FIG. 2C is a representation of the shift register array showing the effective loading of the array when compensation is made for the security delays of the replies of FIG. 2A and for the range changes of the replies of FIG. 2B.

Referring to FIG. 1, interrogation signals generated by a radar transmitter (not shown) are transmitted by a scanning antenna 10. Targets within the beam of antenna 10 respond to interrogations with reply signals which are picked up by the antenna, detected by a receiver 11 and applied as video signals to a decoder 12. Signals from sources other than targets responding to interrogations transmitted by antenna 10 may also be received, detected and applied to the decoder. Decoder 12 generates a logic 1 output for each input pulse train having correctly spaced framing pulses. Outputs from decoder 12 are applied to the input of a first shift register 14-1 of a shift register array 13.

Shift register array 13 comprises a plurality N of shift registers 14-1, 14-2, . . . 14-N. Each of the shift registers of the array 13 contains a identical number of stages, the number of stages being dependent upon the maximum range and range resolution of the radar. The final stage of each shift register of the array is connected to the input stage of the next succeeding shift register so that overflow from the final stage of each shift register is applied as an input to the first stage of the next adjacent shift register. At the end of the first PRI following the first of a sequence of interrogation signals, the range bins of shift register 14-1 will be loaded with logic 1 according to the ranges of the responding targets. At the end of the second PRI of the sequence of interrogation signals, the range bins of shift register 14-1 will be loaded with logic 1 according to the ranges of targets responding to the second interrogation signal and the range bins of shift register 14-2 will be loaded with the replies received to the first interrogation signal in the same order as such replies were previously loaded in shift register 14-1. The replies received during each of the PRIs following a sequence of N interrogation signals are shifted along the columns of shift registers of the array 13 in similar manner so that at the end of the Nth PRI of the sequence, the range bins of shift register 14-N contain the replies in their order of receipt to the first interrogation signal of the sequence and the range bins of shift register 14-1 contain the replies in their order of receipt to the Nth interrogation signals of the sequence.

Each stage of each shift register of array 13 is connected through a separate parallel bus 15-1, 15-2, . . . 15-N to the multiple inputs of one of a plurality N of range filters 16-1, 16-2, . . . 16-N in a range filter bank 17. The range filters of bank 17 are more fully described below with reference to FIG. 3.

In IFF systems, for security purposes, each interrogating signal may contain a coded request to friendly targets that their replies to the interrogation be delayed by a specified amount. The requested amount of delay may be varied from interrogation to interrogation. Each range filter includes a separate input 18-1, 18-2, . . . 18-N for receiving the value of range delay requested in the interrogation signal that elicited the replies stored in the shift register associated with that range filter. For example, the range delay value on input 18-1 is the amount of delay requested in a first interrogation signal that produced the replies stored in shift register 14-1. After the next following interrogation, the replies to the first interrogation will have been transferred to shift register 14-2 and the range delay value on input 18-2 is the delay value, formerly on input 18-1, associated with the replies then stored in register 14-2.

Each of the range filters 16-1, 16-2, . . . 16-N includes an input 19-1, 19-2, . . . 19-N for accepting a range skew value. Range skew values are generated by tracking circuits of the interrogating radar to predict the changes in the range of a fast moving target that may occur from PRI to PRI.

FIG. 2A is a simplified representation of shift register array 13' of an IFF system containing replies from a single target that has been instructed by the interrogating radar to delay its response to each of a sequence of interrogating signals by a specific amount. The replies are scattered through range bins 23-27 of registers 14-1, . . . 14-6 so that a parallel evaluation of the contents of array 13' would not yield a value of M greater than one. When the proper values of range delays are inserted in the reply filters 16-1 . . . 16-6 (not shown in FIG. 2A), the replies of FIG. 2A are effectively aligned at the same range in range bins 30-34 of the registers of array 13', as seen in FIG. 2C. Parallel evaluation of the contents of array 13' then provides a value of M=5 and the replies are declared valid.

The replies from a fast moving target approaching the interrogating radar may present a storage pattern in array 13' as shown in FIG. 2B. There the replies stored in range bins 35 and 36 of registers 14-1 and 14-2 show a displacement in range to range bins 37 and 38 of registers 14-3 and 14-4 and a further displacement in range to range bins 39 and 40 of registers 14-5 and 14-6. Parallel evaluation of the contents of array 13' of FIG. 2B produces a value of M=2, which may not be adequate for declaration of a valid reply. When the proper range skew values are applied to the reply filters 16-1, . . . 16-6 associated with the array 13', the replies of FIG. 2B will, in effect, appear to be stored in range bins 42–47 of FIG. 2C and parallel evaluation of the contents array 13' provides a valid reply value M=6 for a target at the range of range bins 42–47.

Figure 3:
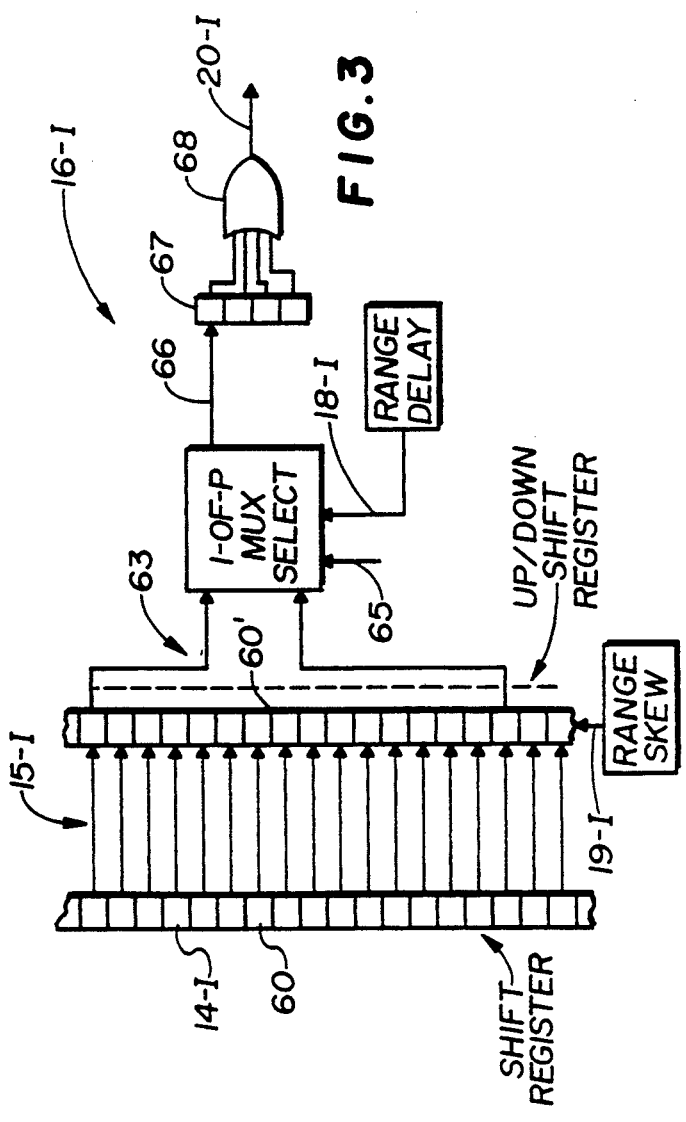
FIG. 3 is a functional block diagram of a typical one of the range filters forming part of the invention.

FIG. 3 is a functional block diagram of reply filter 16-1, which typifies each of the range filters 16-1, . . . 16-N. Shift register 14-1 contains a total of P stages 60 in which decoded replies have been entered in the order of their receipt. Each of the stages 60 of shift register 14-1 is connected in parallel by parallel bus 15-1 to a corresponding stage 60' of an up/down shift register 62 containing a total of at least P stages. Shift register 62 receives a range skew value on input 19-1 causing the reply contents thereof to be shifted up or down an appropriate number of stages to coincide with the predicted range of a target at the time of reply evaluation. Each stage of shift register 62 is connected, in sequential order, through a parallel bus 63 to one of a total of P multiple inputs of a 1-of-P multiplex selector 64. Selector 64 receives a scan command on input 65 that initiates a sequential scan of the inputs 63 from the range bins of register 62. Selector 64 outputs a logic 1 on line 66 to the input stage of a short length shift register 67 each time a logic 1 is encountered on an input 63 contacted by selector 64. The outputs of the stages of shift register 67 are combined in an OR gate 68 to provide a logic 1 on output line 20-1 whenever any of the stages of register 67 contains a logic 1. Shift register 67, clocked at the scan rate of selector 64, allows for a tolerable amount of range jitter between replies stored in adjacent registers of array 13.

Multiplex selector 64 also receives on input 18-1 a range delay value associated with the replies stored in register 62. The range delay value on input 18-1 identifies the particular one the inputs 63 to selector 64 that is to serve as the starting point for the sequential scan of inputs 63 by selector 64. For example, if the interrogating radar instructed friendly targets to delay responses an amount corresponding to five range bins, the range delay value on input 18-1 would order selector 64 to commence sequential scan of the inputs 63 at range bin five.

Again referring to FIG. 1, each of the reply filters 16-1, 16-2, . . . 16-N generates a single logic 1 output 20-1, 20-2, . . . 20-N, corrected for range delay and range skew, when a reply is encountered as the range filters scan through the range bins of the registers of array 13. Outputs 20-1, 20-2, . . . 20-N are applied in parallel both to an azimuth centroid look-up table 21 and to a unary adder circuit 22. Azimuth centroid look-up table 21 generates an output 50 indicating the azimuth of the antenna 10 for the centermost one of a set of replies occurring at the same corrected range. Unary adder 22 simply counts the number of logic 1's appearing on outputs 20-1, . . . 20-N at each step as the range bins of the registers of array 13 are scanned by range filters 16-1, . . . 16-N and outputs the count as a value M on line 51 to a reply decision look-up table 52. Reply decision look-up table 52 receives the value M and information on system operating conditions, such as signal to noise ratio, to select a threshold value of M necessary for declaration of a valid reply. For example, in a system having N=10 shift registers in array 13, look-up table 52 might select a threshold value M=7 for a high S/N ratio and a threshold value M=4 for a low S/N ratio. If the value of M on line 51 exceeds the threshold value of M selected by table 52, a valid reply signal is indicated by an output from table 52 on line 53.

Variations and modifications in the invention are possible in the light of the above teachings. It is therefore to be understood that, within the scope of the appended claims, the invention may be practiced otherwise than as specifically disclosed.

The invention claimed is:

1. The method of evaluating signals received by a secondary radar in response to interrogation signals transmitted by said radar for distinguishing valid replies from false replies, comprising the steps of:

decoding said received signals to establish conformity of said received signals with a predetermined format, said decoded signals conforming with said format constituting reply signals;

storing each of said reply signals received during each of the intervals following N successive interrogation signals, said reply signals being stored in separate storage means for each of said intervals at locations in said storage means corresponding to the times of reception of said replies and being stored for the duration of said N intervals;

scanning said storage means with means for detecting replies stored therein, said scanning being conducted in steps, said detecting means, at each of said scanning steps, contacting in parallel each of said storage locations corresponding to the same time of reply in each of said intervals;

temporarily storing, for a time corresponding to a time duration represented by at least two successive ones of said storage locations, replies detected at each step of said scan;

determining the total number M of said replies detected at each of said scanning steps plus the number of said replies temporarily stored; and generating a valid reply signal whenever said number M exceeds a predetermined threshold.

2. The method as claimed in claim 1 wherein replies to said interrogation signals are delayed by amounts requested by said interrogation signals and wherein said step of scanning each of said storage means is begun at the storage location within each said storage means corresponding to the amount of delay requested by the interrogation signal eliciting the replies contained in each said storage means.

3. The method as claimed in claim 1, wherein certain of the targets transmitting certain of said replies are moving targets, further including the step of:

shifting replies contained in said selected ones of said storage means from the locations at which said replies were stored to new locations within said selected ones of said storage means, said step of shifting replies being performed prior to performing said scanning step, the changes in locations of said replies being such as to compensate for movement of said targets.

4. Means for evaluating signals received by a secondary radar in response to interrogation signals transmitted by said radar, said evaluating means enabling valid replies to be distinguished from false replies, comprising:

means for decoding said received signals to establish conformity of said received signals with a predetermined format, said decoded signals conforming with said format constituting reply signals;

a plurality N of separate storage means, each of said storage means having a series of storage locations corresponding to increments of time, the replies to each of a succession of N interrogation signals being stored in a separate one of said storage means at locations corresponding to the times of reception of said replies;

a plurality N of reply filters, each of the storage locations of each of said storage means being accessible by one of each of said reply filters;

means in each said reply filter for accessing a selected storage location in said storage means associated with each said reply filter and for providing an output indicating the presence of a reply in each said storage location accessed;

means in each said reply filter for temporarily storing said outputs of said accessing means;

means receiving in parallel from all said reply filters said outputs temporarily stored in said reply filters for determining the number M of said outputs received from said reply filters; and means for generating a valid reply signal whenever said number M exceeds a predetermined threshold value.

5. Signal evaluating means as claimed in claim 4, with additionally:

means controlling said accessing means of said reply filters whereby said reply filters are caused to access in synchronism successive ones of said storage locations of each of said plurality of N storage means.

6. Signal evaluating means as claimed in claim 5, with additionally:

second means receiving in parallel from all said reply filters said temporarily stored outputs for determining the azimuth of the source of said outputs whenever a valid reply signal is generated for said outputs.

7. Signal evaluating means as claimed in claim 5, wherein certain of said signals received by said radar are transmitted by moving targets, and with additionally:

means associated with each of said plurality of N storage means for shifting the storage locations of the replies contained in selected ones of said storage means to compensate for movement of the targets transmitting the replies contained in said selected ones of said storage means.

8. Means for evaluating signals received by a secondary radar in response to interrogation signals transmitted by said radar, said evaluating means enabling valid replies to be distinguished from false replies, comprising:

means for decoding said received signals to establish conformity of said received signals with a predetermined format, said decoded signals conforming with said format constituting reply signals;

a plurality N of first shift registers, each of said first shift registers having a plurality P of stages corresponding to increments of time, the replies to each of a succession of N interrogation signals being stored in a separate one of said shift registers at stages corresponding to the times of reception of said replies;

a plurality N of reply filters, one each of said reply filters being associated with one each of said shift registers, each of said reply filters including:

multiplex means for accessing selected ones of said P stages of its associated shift register and for providing an output whenever said selected stage contains a reply;

a second shift register having at least two stages for storing said output of said multiplex means; and means for logically combining the contents of said second shift register into a single reply filter output;

unary adder means receiving in parallel said reply filter output from each of said reply filters for determining the total number M of said reply filter outputs;

means dependent upon operating conditions of said radar for selecting a threshold value; and means for generating a valid reply signal whenever said number M equals or exceeds said threshold value.

9. Signal evaluating means as claimed in claim 8 wherein certain of the signals received by said radar are transmitted by moving targets, and wherein each of said reply filters further includes:

a third shift register, said third shift register being an up/down shift register having at least P stages, said multiplex means being arranged to access selected ones of said P stages of said third shift register;

means for transferring in parallel the contents of said stages of said first shift register associated with said reply filter to similar stages of said third shift register; and means for controlling said third shift register to shift the contents thereof up or down to compensate for movement of the source of replies contained in said third shift register.

10. Signal evaluating means as claimed in claim 9 wherein certain of said signals received by said radar contain security delays requested by interrogation signals transmitted by said radar, and wherein each of said reply filters includes:

means for controlling said multiplex means whereby said multiplex means is caused to access selected stages of said third shift register in such order as to compensate for security delays contained in replies stored in said third shift register.

* * * * *